United States Patent
Zhang et al.

(10) Patent No.: US 10,521,618 B1
(45) Date of Patent: Dec. 31, 2019

(54) METHODS AND APPARATUS FOR SECURE ROOT KEY PROVISIONING

(71) Applicant: Marvell International Ltd., Hamilton (BM)

(72) Inventors: Minda Zhang, Westford, MA (US); Tolga Nihat Aytek, Framingham, MA (US); Jun Yu, Northborough, MA (US); Nilotpal Sensarkar, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 599 days.

(21) Appl. No.: 15/285,320

(22) Filed: Oct. 4, 2016

Related U.S. Application Data

(60) Provisional application No. 62/243,914, filed on Oct. 20, 2015.

(51) Int. Cl.
| | |
|---|---|
| *G06F 21/76* | (2013.01) |
| *H04L 9/06* | (2006.01) |
| *H04L 9/08* | (2006.01) |
| *G06F 21/64* | (2013.01) |

(52) U.S. Cl.
CPC ............ *G06F 21/76* (2013.01); *G06F 21/64* (2013.01); *H04L 9/0643* (2013.01); *H04L 9/0869* (2013.01)

(58) Field of Classification Search
CPC ....................................................... G06F 21/76
USPC .......................................................... 713/192
See application file for complete search history.

(56) References Cited

U.S. PATENT DOCUMENTS

| | | | |
|---|---|---|---|
| 2008/0120676 A1* | 5/2008 | Morad ............. | H04N 21/42607 725/127 |
| 2011/0213954 A1* | 9/2011 | Baik ..................... | G06F 9/4418 713/2 |
| 2013/0073598 A1* | 3/2013 | Jacobson ................ | G06F 7/588 708/252 |
| 2014/0082721 A1* | 3/2014 | Hershman ............... | G06F 21/52 726/16 |
| 2014/0091831 A1* | 4/2014 | Nassib .................... | G06F 21/71 326/8 |
| 2014/0244785 A1* | 8/2014 | Potlapally ............... | H04L 67/10 709/217 |
| 2014/0266120 A1* | 9/2014 | Isham .................. | H02M 3/158 323/283 |

* cited by examiner

*Primary Examiner* — Peter C Shaw

(57) ABSTRACT

The present disclosure describes apparatuses and techniques for secure root key provisioning. In some aspects, a stream of entropy bits is generated based on analog noise. From the stream of entropy bits, entropy symbols are constructed and used to modulate bits of a unique chip identifier to provide a block of modulated symbols. A hash digest of the block of modulated symbols is then calculated to generate a device-level root key. This device-level root key written to a write-only register of a one-time programmable (OTP) memory controller for subsequent writing into an OTP memory. By so doing, unauthorized entities can be prevented from accessing the device-level root key during the secure key provisioning process.

20 Claims, 7 Drawing Sheets

METHODS AND APPARATUS FOR SECURE ROOT KEY PROVISIONING

RELATED APPLICATIONS

This present disclosure claims priority to U.S. Provisional Patent Application Ser. No. 62/243,914 filed Oct. 20, 2015, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

Computing and electronic device often implement security measures to prevent unauthorized entities from accessing data or communications of the device. Some of these security measures encrypt the data or communications using a particular key that is assigned to the device. Typically, the encrypted data or communicated information is decrypted by the device with the same key or by an intended recipient that possesses a copy of the key or a complimentary key. Alternately, the device can decrypt, with the key, data received from a source that encrypted the data with a complementary key for secure communication.

The key of the device, however, is typically assigned to device memory in a manufacturing environment that is non-secure. In some cases, malicious entities exploit security vulnerabilities of device programming equipment or the device itself during the key assignment process to access the device's key when exposed. In such cases, the third party or malicious entity can then defeat the security measures that rely on that key, including the subsequent encryption of the device's data and communications. As such, exposing the key of the device during the key assignment process may compromise security of the device and other devices or networks that use the same or similar keys.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is described that generates, based on analog noise, a stream of entropy bits. From the stream of entropy bits, entropy symbols are constructed and used to modulate bits of a unique chip identifier to provide a block of modulated symbols. A hash digest of the block of modulated symbols is then calculated to generate a device-level root key. The method writes the device-level root key into a write-only register of a one-time programmable (OTP) memory controller for subsequent writing into an OTP memory.

In other aspects, a System-on-Chip (SoC) is described that includes an OTP memory module comprising OTP memory and a write-only register. A security module of the SoC comprises an entropy bit generator, deterministic random bit generator, modulator, and hashing module. The SoC also includes a processor and memory storing processor-executable instructions that, responsive to execution, implement a key provisioner to generate, via the entropy bit generator, a stream of entropy bits. The key provisioner then constructs, via the DRBG and based on the stream of entropy bits, entropy symbols and salts bits of a unique chip identifier with the entropy symbols to provide a block of modulated symbols. A hash digest of the block of modulated symbols is then calculated using the hashing module to generate a device-level root key. The key provisioner then writes the device-level root key to the write-only register of the OTP memory controller for subsequent writing into the OTP memory.

In yet other aspects, a computer-readable memory device is described that stores processor-executable instructions. Responsive to execution by a hardware-based processor, the processor-executable instructions implement a key provisioner to perform operations that comprise sampling, via an analog-to-digital converter, an analog noise source to generate a stream of entropy bits. The operations also include feeding the stream of entropy into a deterministic random bit generator to construct entropy symbols and modulating bits of a unique chip identifier with the entropy symbols to provide a block of modulated symbols. A hash digest of the block of modulated symbols is then calculated, via a hashing algorithm, to generate a device-level root key. The operations also write, to a write-only register of an OTP memory controller, the device-level root key for subsequent writing into OTP memory.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of secure root key provisioning are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Conventional techniques for provisioning root keys to electronic devices often expose the root keys during the provisioning process. For example, some root key provisioning processes use a single program to generate, manipulate, buffer, and write a root key into a memory of a device.

Such applications are typically complex, non-secure, and downloaded to the device prior to execution, all of which contribute to vulnerabilities that can be exploited by malicious actors to access the root key of the device. Additionally, some provisioning applications generate keys with low entropy or randomness, which allows the root key of the device or other devices to be more-easily derived.

This disclosure describes techniques and apparatuses for secure root key provisioning. In some aspects, a stream of entropy bits is generated based on analog noise. From the stream of entropy bits, entropy symbols are constructed and used to modulate bits of a unique chip identifier to provide a block of modulated symbols. Convoluting the stream of entropy symbols with the unique chip identifier with modulation provides a device-unique bit sequence having high entropy. A hash digest of the block of modulated symbols is then calculated to generate a device-level root key. Prior writing the device-level root key into a one-time programmable (OTP) memory, the device-level root key is written into a write-only register of an OTP memory controller. By so doing, unauthorized entities cannot access the device-level root key during the secure root key provisioning process.

These acts may be performed by boot code stored in a read-only memory (boot ROM) of a device, which is often more secure than code that may be downloaded to the device during test and manufacturing. Further, the device-level root key protected from this software because the software is not able to access the write-only register of the OTP memory controller. For example, a boot image can be downloaded to the device to implement more-complex aspects of the secure key provisioning, such as regulating voltage used to burn fuses of the OTP memory. This boot image regulates the voltage applied to the fuses when burning the device-level root key into the OTP memory, but cannot access the write-only register in which the device-level root key locked.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

Figure 1:
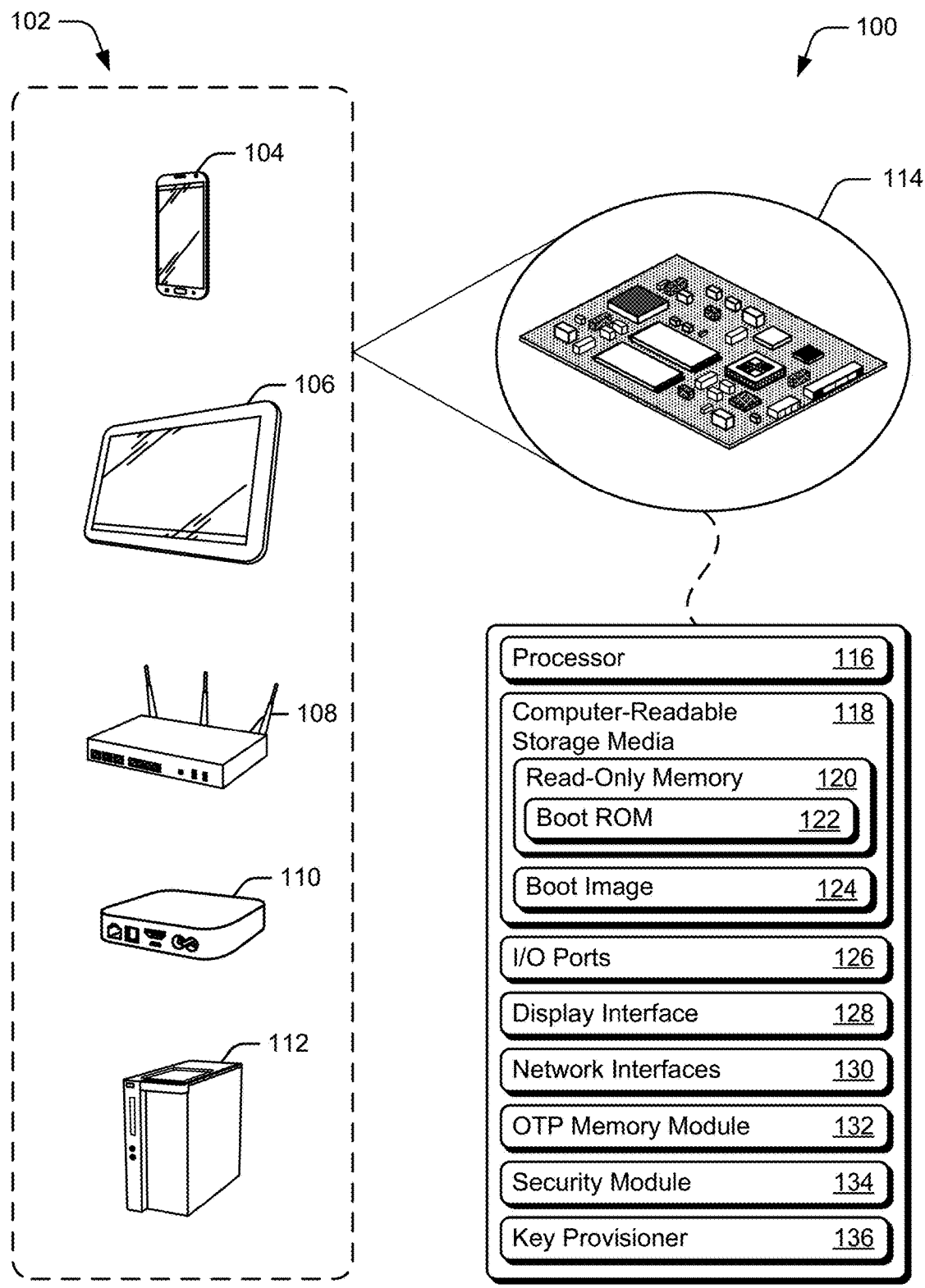
FIG. 1 illustrates an example operating environment having computing devices that include a one-time programmable (OTP) memory module and security module in accordance with one or more aspects.

FIG. 1 illustrates an example operating environment 100 that includes an example computing device 102, which is capable of implementing cryptography and other security functions. Examples of the computing device 102 include a smart phone 104, a tablet computer 106, a wireless router 108, a set-top box 110, and a network-attached storage (NAS) device 112. Further examples of the computing device 102 include a desktop computer, a camera, a printer, a multimedia dongle, a personal media device, a navigation device, a portable gaming device, an Internet-of-Things (IoT) device, and so on. The computing device 102 may implement cryptography or security functions for any suitable purpose, such as to enable security functionalities of a particular type of computing device, enable secure network access, encrypt data for storage, verify software signatures, authenticate users or other devices, sign electronic files or documents, and the like.

The computing device 102 includes a printed circuit board assembly 114 (PCBA) 114 on which components and interconnects of the computing device are embodied. Alternately or additionally, components of the computing device 102 can be embodied on other substrates, such as flexible circuit material or other insulative material. Although not shown, the computing device 102 may also include a housing, various human-input devices, a display, a battery pack, antennas, and the like. Generally, electrical components and electromechanical components of the computing device 102 are assembled onto a printed circuit board (PCB) to form the PCBA 114. Various components of the PCBA 114 (e.g., processors and memories) are then programmed and tested to verify correct function of the PCBA. The PCBA 114 is connected to or assembled with other parts of the computing device 102 into a housing.

In this particular example, the PCBA 114 includes a processor 116 and computer-readable storage media 118. The processor 116 can be any suitable type of processor, either single core or multi-core, for executing instructions or commands of an operating system or application of the computing device 102. The computer-readable storage media 118 (CRM 118) includes volatile memory and non-volatile memory for storing various data and instructions of the computing device 102. In the context of this disclosure, the CRM 118 is implemented as storage media, and thus does not include transitory signals or carrier waves.

The CRM 118 includes a read-only memory 120 (ROM 120) storing boot ROM code 122 (Boot ROM 122), which can be executed at power-on to initialize components of the computing device 102. Alternately or additionally, the boot ROM 122 may program or configure components of the PCBA 114 during various stages of test and assembly. The CRM 118 also includes a boot image 124 to boot the computing device 102 and perform other functions, such as system initialization, component configuration, security-related operations, and the like. The implementations and uses of boot ROM 122 and boot image 124 vary and are described throughout the disclosure.

The PCBA 114 may also include I/O ports 126, display interface 128, and network interfaces 130. The I/O ports 126 allow the computing device 102 to interact with other devices or users. The I/O ports 126 may include any combination of internal or external ports, such as USB ports, audio ports, Serial ATA (SATA) ports, PCI-express based ports or card-slots, secure digital input/output (SDIO) slots, and/or other legacy ports. Various peripherals may be operatively coupled with the I/O ports 126, such as human-input devices (HIDs), external computer-readable storage media, or other peripherals.

The display interface 128 enables presentation of a user interface or other graphics of the computing device 102 via a display connected to the interface. The display may be integrated with the computing device 102 or an external display connected via a wired or wireless link. The network interfaces 130 provide connectivity to one or more networks and other devices connected therewith. Data communicated over network interfaces 130 may be packetized or framed depending on a communication protocol or standard by which the computing device 102 is communicating. The network interfaces 130 may include wired interfaces, such as Ethernet or fiber optic interfaces for communication over a local network, intranet, or the Internet. Alternately or additionally, the network interfaces 130 may include wireless interfaces that facilitate communication over wireless networks, such as wireless LANs, cellular networks, or wireless personal-area-networks (WPANs).

The computing device 102 also includes a one-time programmable (OTP) memory module 132, security module 134, and a key provisioner 136. The OTP memory module 132 includes an OTP memory control logic and OTP memory media, such as fuse or anti-fuse banks that are irreversibly burned to program. The security module 134 implements security functions of the computing device 102 and may include any suitable type of cryptographic processors or hashing modules. In some aspects, the key provisioner 136 coordinates various acts or functions of the OTP memory module 132 and security module 134 to provision a root key to the computing device 102. The implementations and uses of the OTP memory module 132, security module 134, and key provisioner 136 vary and are described throughout the disclosure.

Figure 2:
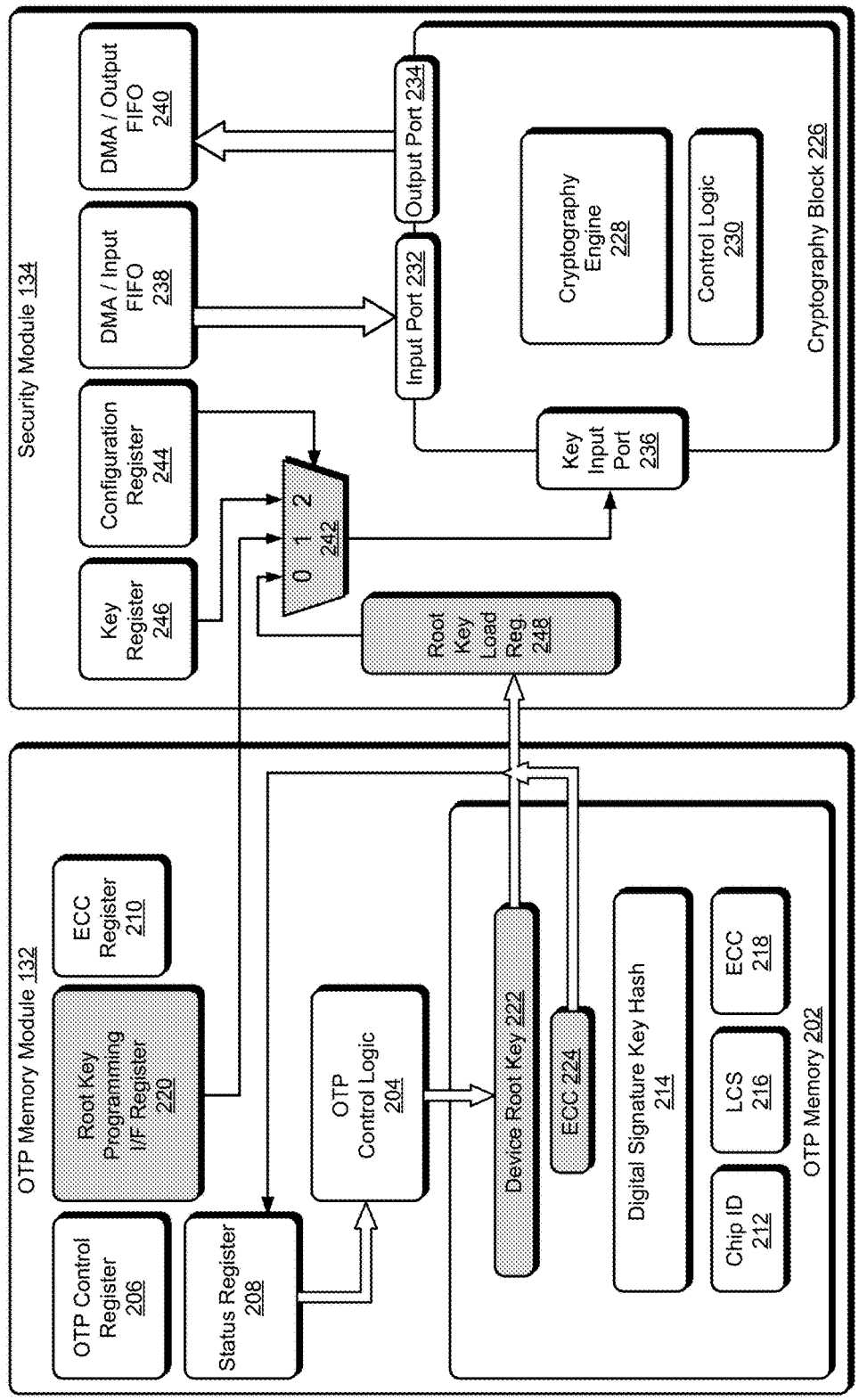
FIG. 2 illustrates example configurations of the OTP memory module and security module shown in FIG. 1.

FIG. 2 illustrates example configurations of an OTP memory module and security module generally at 200. The illustrated OTP memory module 132 and security module 134 may represent intellectual property (IP) cores, IP macros, IP blocks, or any other suitable unit of circuitry (e.g., logic, cells, chip layout/nets). Alternately or additionally, each or both of the OTP memory module 132 and security module 134 may be implemented as part of a system-on-chip (SoC), application-specific standard part (ASSP), digital signal processor (DSP), programmable SoC (PSoC), or field-programmable gate array (FPGA).

The OTP memory module 132 may include any suitable combination of OTP memory, control logic, registers, and/or programming interfaces. Access to or permissions of each entity of the OTP memory can be provisioned or configured differently. For example, control and status registers may be configured for read/write access. Alternately, programming interfaces and sections of the OTP memory can be configured as write-only to prevent contents of these entities from being accessed (e.g., by firmware or via programming interfaces).

In this particular example, the OTP memory module 132 includes OTP memory 202, OTP control logic 204, OTP control register 206, and status register 208. The OTP control register 206 provides an interface for the OTP memory module 132 to communicate with other components of the PCBA 114, such as a boot image or firmware executed on processor 116. The OTP control logic 204 may be implemented as a finite state machine to control or manage functionalities of the OTP memory module 132. The status register 208 can track respective statuses of other entities of the OTP memory module 132. Alternately or additionally, the status register may transmit or expose indications of the respective statuses to other components of the PCBA 114.

The OTP memory 202 may be implemented as any suitable number of registers or banks of OTP memory cells. In some cases, the OTP memory cells comprise fuses or anti-fuses that are irreversibly burned to store data or information in the OTP memory 202. In this particular example, the OTP memory includes a chip identifier register (chip ID 212), digital signature key hash register 214, life cycle-state register 216 (LCS 216), and error checking and correcting (ECC) register 218. The chip ID register 212 may store a universally unique identifier (UUID) of the PCBA 114, processor 116, or a system composed of one or more components of the PCBA 114. For example, a UUID of the processor 116 may be written or burned into the chip ID register 212 during manufacture of a chip in which the OTP memory module 132 resides, the PCBA 114, or computing device 102.

The digital signature key hash register 214 stores a hash of a digital signature key or public key. In some cases, a hash digest of the digital signature key or public key is written or burned into the OTP memory by a chip, PCBA, or device manufacturer. The digital signature key hash can be used to authenticate or verify data received by other entities, such as boot images or software downloaded in a memory of the PCBA 114. The LCS 216 register tracks a life cycle-state of a chip or PCBA on which the OTP memory module 132 is embodied. For example, a value or cells of the LCS register 216 can be altered after completion of various manufacturing stages to enable or disable particular functions of the chip or PCBA. For example, after the PCBA 114 is assembled, the LCS register value can be altered to disable programming, diagnostic, and testing ports (e.g., Joint Test Action Group (JTAG) ports).

The ECC register 218 may be implemented to store ECC parity bit value of a key or signature, such as a public key, private key or digital signature. In some cases, the OTP memory module 132 determines an ECC parity bit value and stores the determined bit value in the ECC register 218. In such cases, the OTP memory module 132 may compare or match the determined ECC parity bit value to a parity bit value of data to verify the data.

The OTP memory module also includes a root key programming interface register 220, device-level root key register 222, and root key ECC register 224. As indicated by the legend of FIG. 2, these registers are write-only registers and may not be accessed by read operations. Keys or other information can be written into the OTP memory 202 through the root key programming interface register 220. For example, the root key programming interface register 220 can store a received or generated key for burning into the OTP memory 202. The device root key register 222 in the OTP memory 202 can store data or a key of any suitable size, such as 128 bits, 256 bits, 512 bits, and so on. The root key ECC register 224 is also implemented in the OTP memory 202 and configured to store an ECC value associated with a device-level root key.

In some aspect, a root key is received from security module 134, which may implement various security and cryptography operations via a cryptography block 226. The cryptography block 226 includes a cryptography engine 228 and control logic 230. In some cases, the cryptography engine 228 includes a pool of cryptography engines and other modules, such as hashing modules and random number generators. The control logic 230 manages functions and data of the cryptography block 226 and may be implemented via a finite state machine.

The cryptography block 226 also includes a input data port 232, output data port 234, and key input port 236. In this particular example, the input data port 232 is connected to a direct memory access (DMA) input first-in-first-out (FIFO) register 238, through which data is input into the cryptography block 226. The output data port 234 is connected to a DMA out FIFO register 240 and provides an output for the cryptography block 226. The cryptography block 226 can receive cryptography keys through the key input port 236.

Key selection is enabled through a multiplexing circuit 242 that is controlled by a configuration register 244. The inputs of the multiplexing circuit are coupled to or receive keys from the root key programming interface register 220, a key register of the security module, and a root key load register 248 of the security module. As indicated by the legend of FIG. 2, the root key load register 248 and multiplexing circuit 242 are write-only registers and may not be accessed by read operations. Thus, the device-level root key of the PCBA 114 or device 102 is secure and protected from unauthorized access in the security module 134 as well. From the key input port 236, the keys can be provided to the cryptography engine 228 for implementing various cryptography functions.

Figure 3:
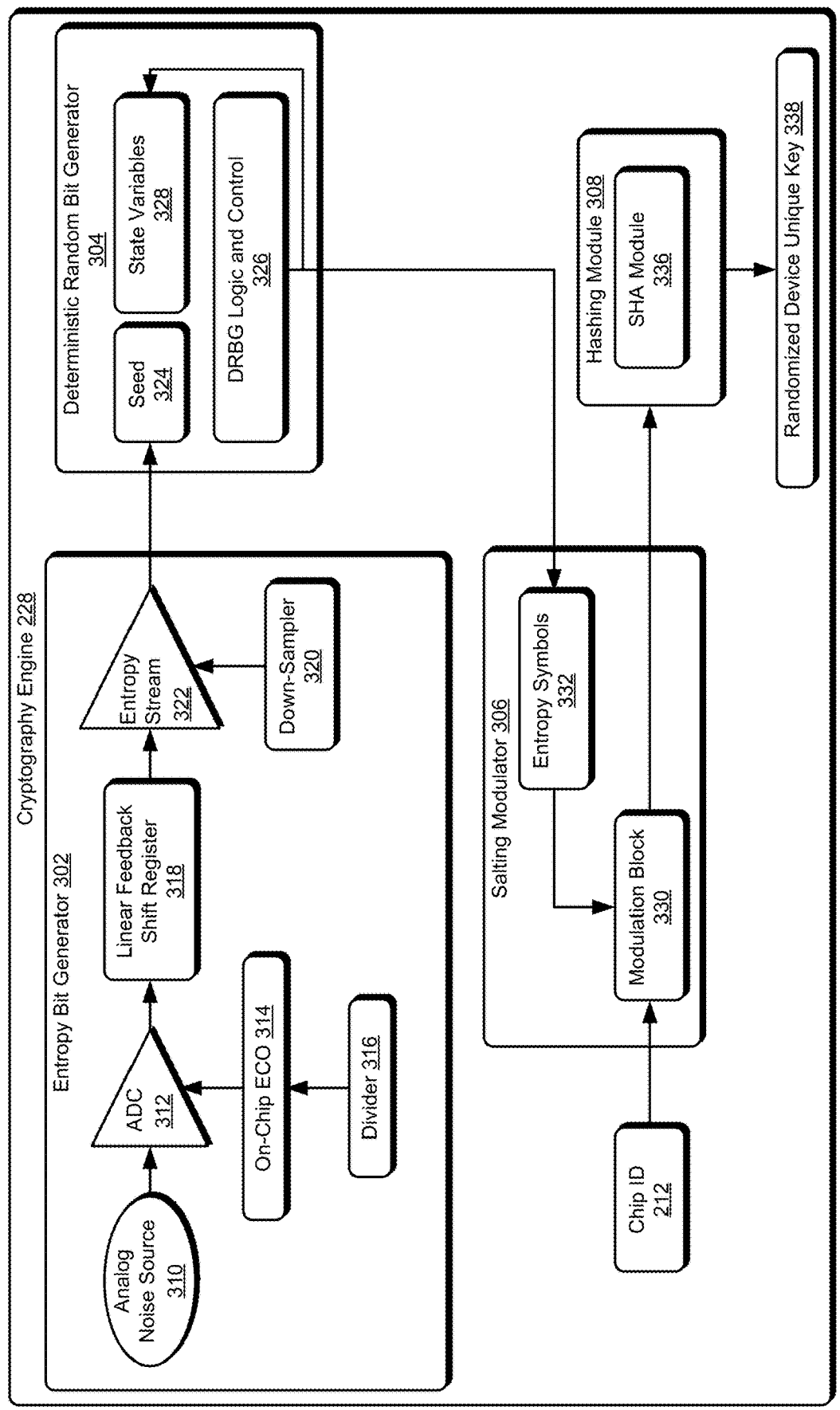
FIG. 3 illustrates an example configuration of the cryptography engine shown in FIG. 2.

FIG. 3 illustrates an example configuration of a cryptography engine in accordance with one or more aspects. In this particular example, the cryptography engine includes an entropy bit generator 302, deterministic random bit generator 304 (DRBG), salting modulator 306, and a hashing module 308. The entropy bit generator samples an analog noise source 310 via an analog-to-digital converter 312 (ADC 312). The analog noise source may generate an analog signal from any suitable source, such as pink noise, temperature, audio signals, and the like. The entropy bit generator 302 also includes an on-chip electron coupled oscillator 314 (on-chip ECO 314) and divider 316 to provide a high sampling (e.g., 100 kHz-1 MHz) rate that is configurable. A stream of bits generated by the ADC 312 are fed into a liner-feedback register 318 (LFSR) of the entropy bit generator 302 for filtering.

A down-sampler 320 of the entropy bit generator 302 down-samples or decimates a stream of entropy bits 322 provided by the LFSR 318. A rate of the down-sampler 320 may also be configurable, such as by varying a frequency of a clock source connected to the down-sampler 320. The DRBG 304 includes a seed input 324 to receive the stream of entropy bits 322 from the entropy bit generator 302. A DRBG logic and control block of the DRBG 304 generates a stream of entropy symbols 332, which are provide to the salting modulator and fed back into a state variables register of the DRBG 304. The DRBG 304 may implement any suitable type of random number generation or comply with a particular (e.g., minimum) security standard, such as National Institute of Standards and Technology's Special Publication 800-90a.

The salting modulator 306 is connected to the output of the DRBG 304 and includes a modulation block 330 to modulate the entropy symbols 332 with the chip ID 212. In some cases, the salting modulation 306 modulates the chip ID bits with the entropy symbols 332 generated by the DRBG 304. By so doing, a pool of modulated symbols can be generated that have high entropy and are uniquely associated to the chip ID.

For example, each individual bit of the chip ID 212 is processed starting from a most significant bit (MSB) to a least significant bit (LSB) or from LSB to MSB. When a current bit of chip ID 212 is a one (1b'1), DRBG 304 is activated to generate a set of random bits (e.g., 256-bits) and the modulation block 330 selects a symbol from this symbol set that is not a zero-symbol. Further, if unable to select a non-zero symbol, the modulation block 330 can retrieve additional sets of bits from the DRBG 304 until a non-zero symbol is selected. Alternately, when a current bit of the chip ID 212 is zero (1b'0), the salting modulator 306 constructs a zero-symbol. The salting modulator 306 can then construct a message block that includes all the symbols selected by modulation block 330 and transmit the message block to the hashing module 308.

The hashing module includes a secure hash algorithm (SHA) module 336 to provide hashes or digests of digital data. The SHA module 336 may implement any set of cryptographic hash functions or comply with a particular standard, such as SHA256. In some cases, the SHA module 336 is configured to compute a hash digest of the message block constructed by the salting modulator 306. In such cases, the SHA module 336 can generate a randomized device-unique key 338 (e.g., 256-bit) that is suitable for use as a device-level root key.

Techniques of Secure Root Key Provisioning

The following discussion describes techniques of secure root key provisioning. These techniques can be implemented using any of the environments and entities described herein, such as the OTP memory module 132, security module 134, and/or key provisioner 136. These techniques include methods illustrated in FIGS. 4, 5, and 6, each of which is shown as a set of operations performed by one or more entities. These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2 and 3 by way of example. Such reference is not to be taken as limiting described aspects to operating environment 100 but rather as illustrative of one of a variety of examples.

Figure 4:
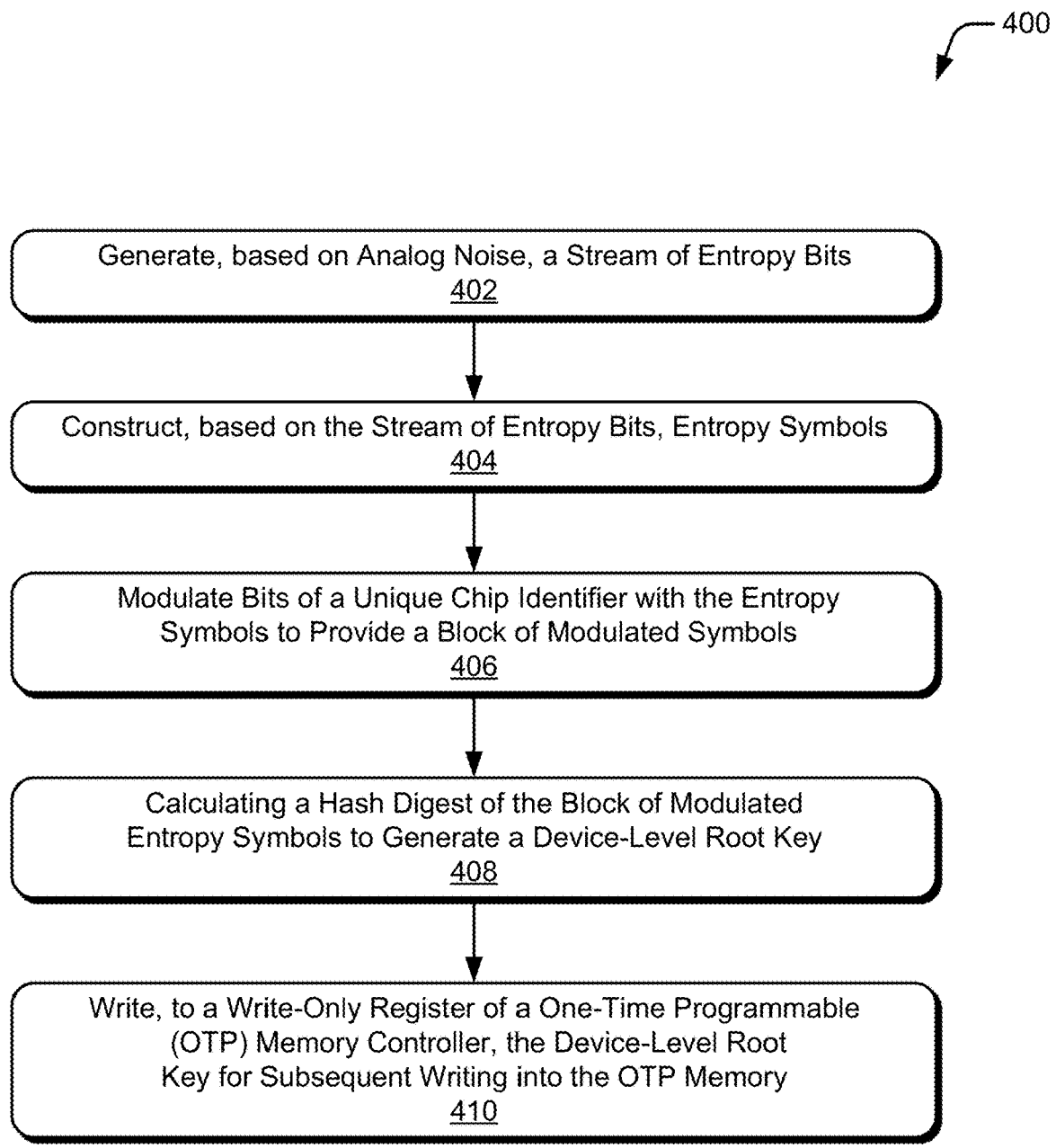
FIG. 4 illustrates an example method for generating a device-level root key in accordance with one or more aspects.

FIG. 4 depicts an example method 400 for generating a device-level root key, including operations performed by the OTP memory module 132, security module 134, or key provisioner 136.

At 402, a stream of entropy bits is generated based on analog noise. The analog noise may be received from any suitable noise source, such as a thermal or audio circuit. In some cases, an ADC generates the stream of entropy bits by up-sampling the analog noise. A sampling frequency of the ADC may also be varied while the analog noise is sampled. Alternately or additionally, the stream of entropy bits may be filtered or down-sampled to provide a filtered stream of entropy bits.

By way of example, consider smart-phone 104 and printed circuit board assembly of 114 of FIG. 1. Here, assume the printed circuit board assembly 114 is being manufactured and assembled for the smart phone 104. In this context, various components have been placed and soldered to a circuit board to form the PCBA 114. Once assembled, the PCBA 114 advances to test and programming stages to verify functionality, component configuration, and for software loading.

Further, assume that power is being applied to the PCBA 114 for the first time as a complete assembly. In response to this power-on event, a processor of the PCBA 114 executes boot ROM 122 to implement a key provisioner 136. In some aspects, the key provisioner 136 is configured to provision a device-level root key to OTP memory of a printed circuit board at first power-on. Although not yet assembled as a device, the PCBA 114 will be combined with other components to form the smart phone 104, which will rely on the root key for security. In the context of the method 300, the key provisioner 136 activates the entropy bit generator 302 and deterministic random bit generator 304 to generate a stream of entropy bits.

At 404, entropy symbols are constructed based on the stream of entropy bits. The entropy symbols may include any suitable number of the entropy bits. For example, 8-bit, 16-bit, or 32-bit symbols can be constructed from the stream of entropy bits. In some cases, using the larger entropy symbols increases an entropy of keys that are generated with the entropy symbols.

In the context of the present example, the key provisioner 136 feeds the stream of entropy bits into the salting modulator 306. The salting modulator 306 then constructs, based on the stream of entropy bits, entropy symbols for subsequent modulation.

At 406, bits of a unique chip identifier are modulated with the entropy symbols to provide a block of modulated symbols. The unique identifier may be a UUID of a silicon-based chip mounted to the printed circuit board. In some cases, the unique identifier is retrieved from a one-time programmable memory of a memory controller, System-on-Chip, or processor. In some cases, each bit of the IC's unique identifier is modulated with respective ones of the entropy symbols. Alternately or additionally, zero bit values of the unique identifier may be constructed as zero value symbols.

Continuing the ongoing example, the key provisioner 136 retrieves the chip ID 212 from OTP memory 202. The key provisioner then inputs the chip ID 212 into the salting modulator via the key input port of the cryptography block 226. The modulation block then modulates each bit of the chip ID 212 with the entropy symbols 332 to provide a block of modulated symbols.

At 408, a hash digest of the block of modulated symbols is calculated to generate a device-level root key. The hash digest of the modulated symbols may comprise any suitable number of bits, such as 64, 128, 256, or 512. In the context of the present example, the key provisioner 136 inputs the block of modulated symbols into the hash module 308. The hash module 308 then calculates a hash digest of the block of symbols to generate the device-level root key.

At 410, the device-level root key is written to a write-only register of an OTP memory controller. This write-only register stores or locks the device-level root key for subsequent writing into OTP memory. In other words, the write-only register cannot be accessed via a read operation, which protects the device-level root key from unauthorized access. Concluding the present example, the key provisioner 136 writes the device-level root key into the root key programming interface 220 of the OTP memory module 202 for subsequent burning.

Figure 5:
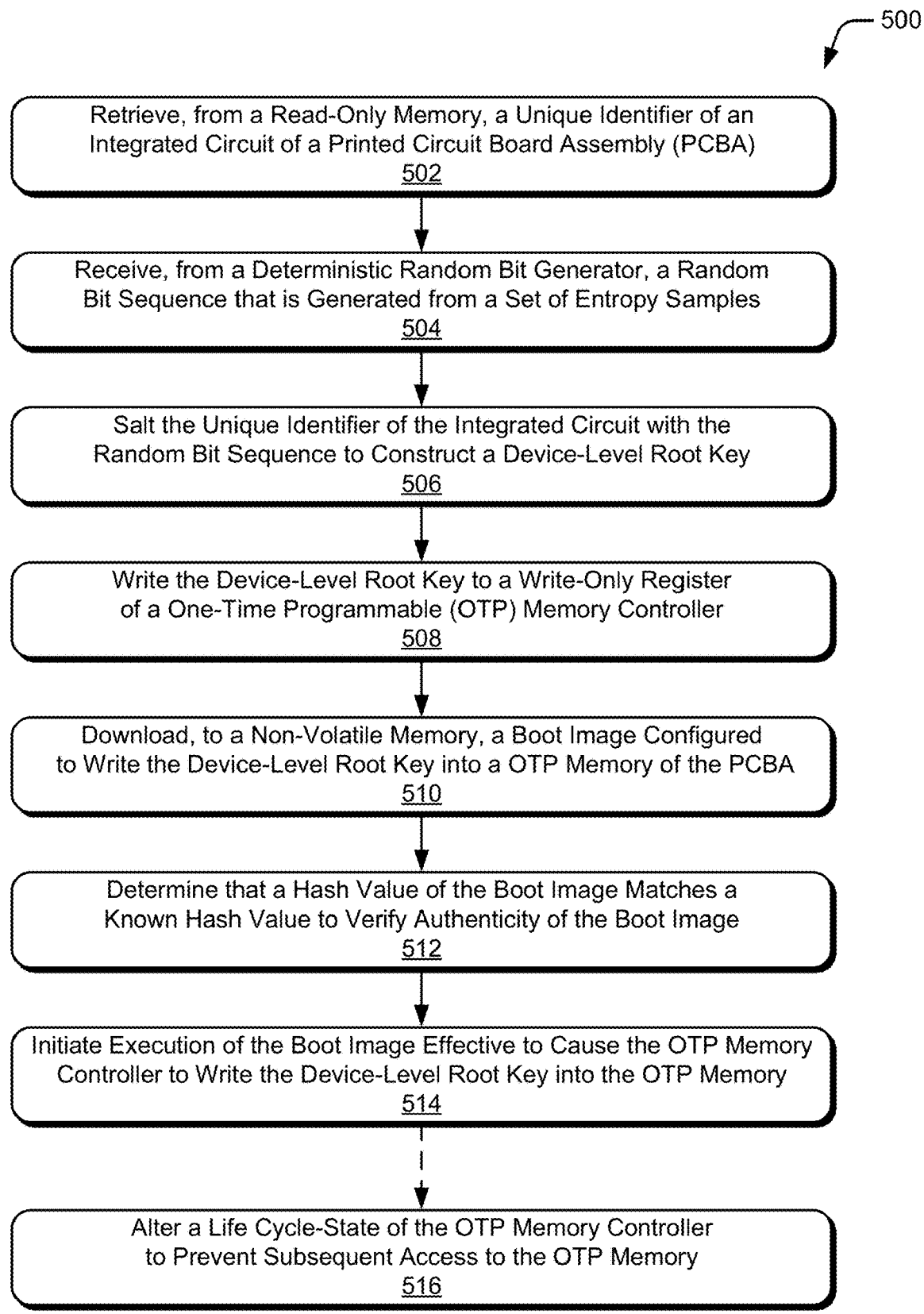
FIG. 5 illustrates an example method for securely provisioning a device-level root key to a printed circuit board assembly.

FIG. 5 depicts an example method 500 for securely provisioning a device-level root key to a printed circuit board assembly, including operations performed by the OTP memory module 132, security module 134, or key provisioner 136.

At 502, a unique identifier of an integrated circuit (IC) is retrieved from a read-only memory. The unique identifier may be a UUID of a silicon-based chip mounted to a printed circuit board. In some cases, the unique identifier is retrieved from a one-time programmable memory of a System-on-Chip, processor, or memory controller. In such cases, a silicon manufacturer may provision the unique identifier to the IC during manufacture.

At 504, a random bit sequence is received from a deterministic random bit generator. The random bit sequence may be generated based on a set of analog noise entropy samples. In some cases, the random bit sequence can be formed into entropy symbols for subsequent processing. The entropy symbols may be formed from any suitable number of random bits, such as 8, 16, 32, or more bits.

At 506, the unique identifier of the IC is salted with the random bit sequence to construct a device-level root key. In some cases, each bit of the IC's unique identifier is modulated with symbols formed from the random bit sequence. Alternately or additionally, zero bit values of the unique identifier may be constructed as zero value symbols or as fixed non-zero value symbols. For example, the salting modulator 306 of the security module 134 can modulate every bit of chip ID 212 to provide a device-level root key for the PCBA 114.

At 508, the device-level root key is written to a write-only register of an OTP memory controller. The write-only register may be a programming interface of the OTP memory controller. This write-only register stores or locks the device-level root key for subsequent writing into OTP memory. In other words, the write-only register cannot be accessed via a read operation, which can protect the device-level root key from unauthorized access during a key provisioning process.

At 510, a boot image configured to write the device-level root key into OTP memory is downloaded. In some cases, key provisioning functions are separated between boot ROM and this boot image. In such cases, the boot image can be configured to regulate voltage during a fuse burning processes during which the device-level root key is burned into the OTP memory. By so doing, the larger boot image can manage the complex process and variables associated with burning the fuses of the OTP memory.

At 512, it is determined that a hash value of the boot image matches a known hash value to verify authenticity of the boot image. In some cases, a public key infrastructure (PKI) based digital signature is required to verify or to authorize the boot image for key provisioning. This may be effective to verify that the boot image was created by an authorized chip, assembly, or device manufacturer. Alternately, if verification of boot image authenticity fails, the key provisioning process can be aborted by the boot ROM to prevent the OTP memory fuses from being burned.

At 514, execution of the boot image is initiated. This can be effective to cause the OTP memory controller to write the device-level root key into the OTP memory. In some cases, and by design, the boot image cannot access the device-level root key due to the write-only nature of the registers. Therefore, the boot image can provide an ECC pattern of the device-level root key to the OTP memory controller to ensure the ECC pattern matches the device-level root key's ECC stored in OTP.

Optionally at 516, a life cycle-state of the OTP memory controller is altered to prevent subsequent access to the OTP memory. The life cycle-state may track a life-cycle of a printed circuit board or device in which the OTP memory controller is assembled. Example life cycle-states may include "chip manufacturing," "board manufacturing," "device manufacturing," "device deployment," and the like. In some cases, the life cycle-state is altered from "chip manufacturing" or "board manufacturing" to "device manufacturing" to disable access to particular parts of the OTP memory. In such cases, test or diagnostic ports of the OTP memory module or security module may be disabled once the life-cycle state is beyond "manufacturing".

Figure 6:
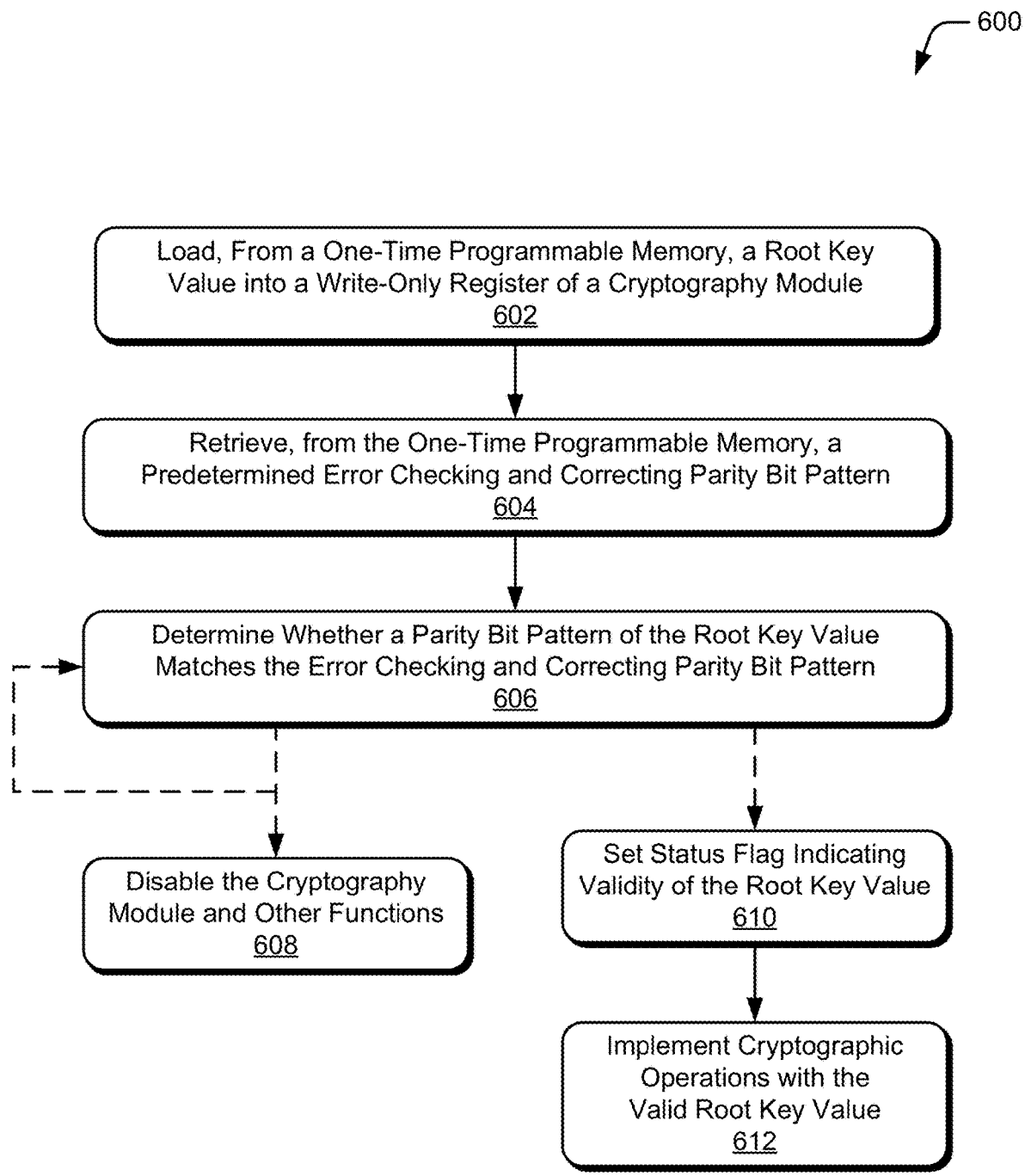
FIG. 6 illustrates an example method for validating a root key for use in cryptographic operations.

FIG. 6 depicts an example method 600 for validating a root key for use in cryptographic operations, including operations performed by the OTP memory module 132, security module 134, or key provisioner 136.

At 602, a root key value is loaded, from an OTP memory, into a write-only register of a cryptography module. The OTP memory may be associated with an OTP memory controller or module that manages access or distribution of the root key value to other modules or IP blocks of a PCBA or device. The root key value may comprise any suitable number of bits, such as 64, 128, 256, 512. The OTP memory or register from which the root key value is loaded may also be a write-only section of memory or register. By storing or maintaining the root key value in write-only memory and registers, exposure of the root key value is minimized to protect the root key value from unauthorized access.

At 604, a predetermined error checking and correcting (ECC) parity bit pattern is retrieved from the OTP memory. The ECC parity bit pattern may be determined by an OTP memory module or controller when the root key value is generated or received. In some cases, the predetermined ECC parity bit pattern is stored in a write-only register of the OTP memory to prevent the ECC parity bit pattern from being accessed. When retrieved, the predetermined ECC parity bit pattern may also be stored in a write-only or limited-access register to prevent exposure of the ECC parity bit pattern.

At 606, it is determined whether an ECC parity bit pattern of the root key value matches the predetermined ECC parity bit pattern. This determination may be performed by the security module, the OTP memory module, or key provisioner. For example, the ECC parity bit pattern of the root key value can be generated by the OTP memory module or security module to facilitate comparison with the predetermined ECC parity bit pattern.

From 606, the method 600 may repeat operation 606 in an attempt to re-validate the root key value or proceed to 608 in response to determining the ECC parity bit pattern of the root key does not match the predetermined ECC parity bit pattern. In some cases, operation 606 is repeated a predetermined number of times before method 600 advances to operation 608. Alternately, method 600 proceeds to 610 in response to determining that the ECC parity bit pattern of the root key value matches the predetermined ECC parity bit pattern.

At 608, cryptography and other functions of the PCBA assembly are disabled. In response to determining that the root key value is invalid, the cryptography functions of the PCBA or computing device in which the PCBA is assembled. In some cases, the OTP memory module is also disabled, such as by burning some or all of the remaining fuses of a fuse bank that stores the root key value. Alternately or additionally, an invalid flag or register bit can be set to indicate that the root key value of the computing device is invalid or compromised. For example, responsive to an invalid root key bit being set, an alert may be transmitted to a user associated with the device or a manufacturer of the device or chip.

At 610, a status flag indicating validity of the root key value is set. In some cases, the OTP memory module sets the status flag in response to verifying validity of the root key value. The status flag may comprise a bit in a register of the OTP memory module or a register of the security module. In some cases, the OTP module transmits an indication of root key validity to the security module into which the root key value is loaded.

At 612, cryptographic operations are implemented with the value root key value. Once validity of the root key value is validated, the root key value can be loaded into a cryptography engine of the security module. This enables the cryptography engine to implement various operations with the root key value, such as data encryption, data decryption, file authentication, and the like.

System-on-Chip

Figure 7:
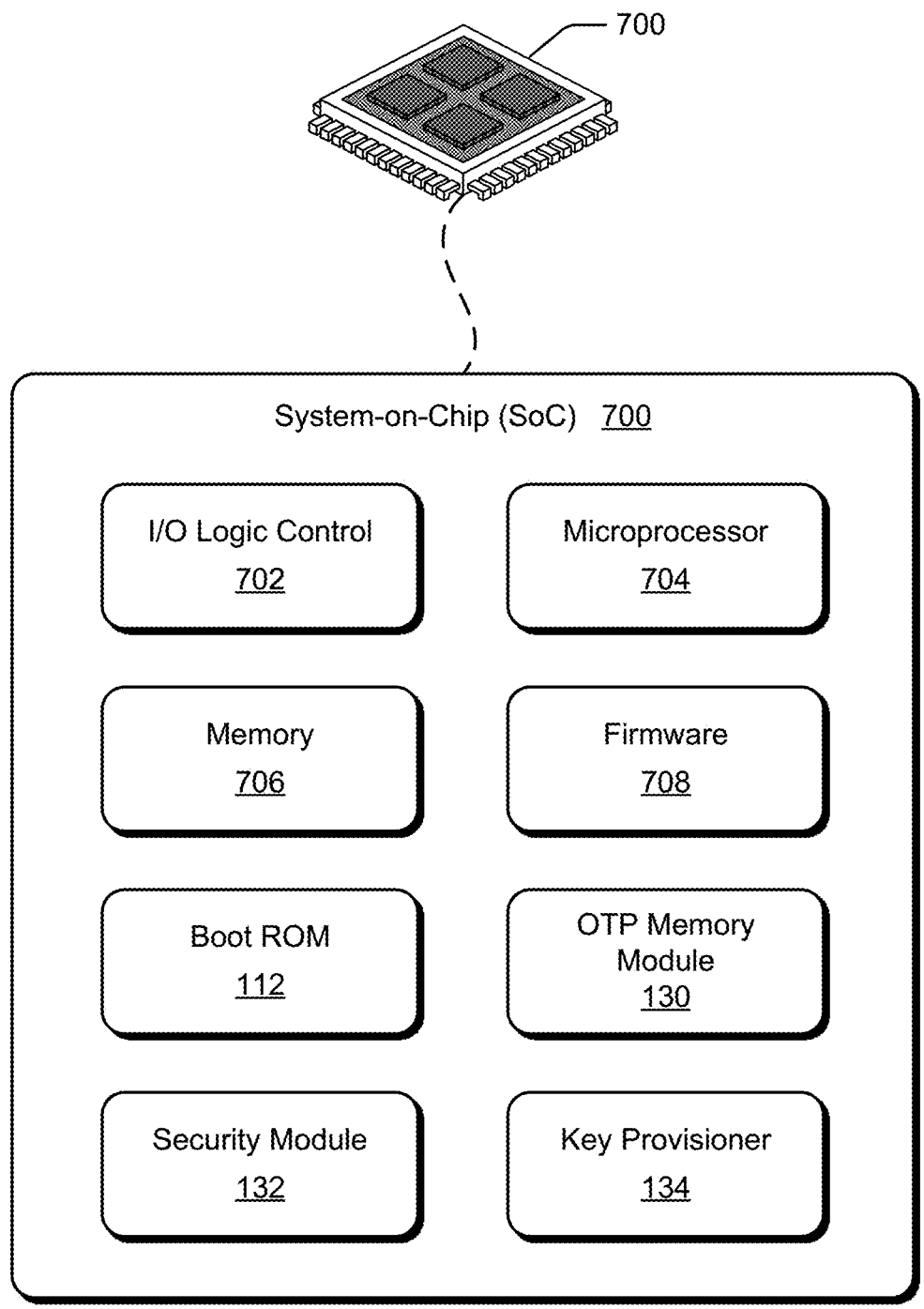
FIG. 7 illustrates an example System-on-Chip (SoC) environment for implementing aspects of secure root key provisioning.

FIG. 7 illustrates an exemplary System-on-Chip (SoC) 700 that can implement various aspects of secure root key provisioning. The SoC 700 can be implemented in any suitable device, such as a smart-phone, cellular phone, netbook, tablet computer, server, wireless router, network-attached storage, camera, smart appliance, printer, a set-top box, or any other suitable type of device. Although described with reference to a SoC, the entities of FIG. 7 may also be implemented as an ASIC, ASSP, DSP, PSoC, or FPGA.

The SoC 700 can be integrated with electronic circuitry, a microprocessor, memory, input-output (I/O) logic control, communication interfaces, other hardware, firmware, and/or software useful to provide functionalities of a device, such as any of the devices listed herein. The SoC 700 can also include an integrated data bus (not shown) that couples the various components of the SoC for data communication between the components. The integrated data bus or other components of the SoC 700 may be exposed or accessed through an external port, such as a JTAG port. For example, components the SoC 700 may be tested, configured, or programmed (e.g., flashed) through the external port at different stages of manufacture.

In this example, the SoC 700 includes various components such as input-output (I/O) logic control 702 (e.g., to include electronic circuitry) and a microprocessor 704 (e.g., any of a microcontroller, processor core, application processor, or DSP). The SoC 700 also includes memory 706, which can be any type and/or combination of RAM, SRAM, DRAM, low-latency nonvolatile memory, ROM, one-time programmable (OTP) memory, and/or other suitable electronic data storage. Alternately or additionally, SoC 700 may comprise a data interface (not shown) for accessing additional or expandable off-chip memory, such as external SRAM or flash memory. SoC 700 can also include various applications, operating systems, and/or software, such as firmware 708 and boot rom 122, which can be computer-executable instructions maintained by memory 706 and executed by microprocessor 704. SoC 700 may also include other various memory interfaces and components embodied as hardware, firmware, software, or any suitable combination thereof.

The SoC 700 also includes OTP memory module 132, security module 134, and key provisioner 136, which may be embodied as disparate or combined components, as described in relation to aspects presented herein. Examples of these components and/or entities, and their corresponding functionality, are described with reference to the respective components of the environment 100 shown in FIGS. 1-3. The key provisioner 136, either in whole or part, can be implemented as processor-executable instructions (e.g., boot rom 122) maintained by the memory 706 and executed by the microprocessor 704 to implement various aspects and/or features described herein.

The key provisioner 136, either independently or in combination with other entities, can be implemented with any suitable combination of components or circuitry to implement various aspects and/or features described herein. The key provisioner 136 may also be provided integral with other entities of SoC 700, such as integrated with the I/O logic 702, a memory controller, or cryptography block within SoC 700. Alternately or additionally, the key provisioner 136 and the other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:
1. A System-on-Chip (SoC) comprising:
 a one-time programmable (OTP) memory module that includes OTP memory and a write-only register;
 a security module that includes an entropy bit generator, deterministic random bit generator (DRBG), a modulator, and a hashing module;
 a hardware-based processor having a unique identifier;
 a hardware-based key provisioner implemented to:
  generate, via the entropy bit generator, a stream of entropy bits;

construct, via the DRBG and based on the stream of
entropy bits, entropy symbols that comprise respective sequences of random bits;
salt, via the modulator, bits of a unique chip identifier of the SoC with respective ones of the entropy symbols to generate a block of modulated symbols based on the unique identifier of the SoC, the unique chip identifier of the SoC associated with the unique identifier of the hardware-based processor of the SoC;
calculate, via the hashing module, a hash digest of the block of modulated symbols generated based on the unique chip identifier of the SoC to generate a device-level root key; and
write, to the write-only register of the OTP memory module, the device-level root key for subsequent writing into the OTP memory of the OTP memory module.

2. The SoC as recited in claim 1, wherein the SoC further comprises a data interface and a volatile memory that is accessible by the hardware-based processor, and the key provisioner is further implemented to:
load, via the data interface, a boot image into the volatile memory, the boot image configured to write the device-level root key into the OTP memory;
retrieve, from the OTP memory, a known hash value that is useful to authenticate information;
determine that a hash value of the boot image matches the known hash value to verify authenticity of the boot image; and
initiate execution of the boot image by the hardware-based processor to cause the OTP memory module to write, from the write-only register, the device-level root key into the OTP memory.

3. The SoC as recited in claim 2, wherein:
the write-only register of the OTP memory module is a write-only programming register;
the OTP memory module includes a write-only register of OTP memory cells; and
the device-level root key is written from the write-only programming register to the write-only register of OTP memory cells.

4. The SoC as recited in claim 3, wherein:
the OTP memory cells comprise fuses; and
the boot image is configured to regulate voltage applied to the fuses to burn the device-level root key into the fuses of the OTP memory.

5. The SoC as recited in claim 1, wherein the entropy bit generator of the security module comprises:
an analog-to-digital converter (ADC) to up-sample an analog noise source to provide analog noise sample bits;
a linear-feedback shift register to filter the analog noise sample bits to provide digital noise sample bits; and
a latch circuit to down-sample the digital noise sample bits to provide the stream of entropy bits.

6. The SoC as recited in claim 1, wherein:
the OTP memory module further comprises a life cycle-state register of OTP memory cells; and
the key provisioner is further implemented to increment, responsive to the device-level root key being written into the OTP memory, a value of the life-cycle state register to prevent subsequent access to key provisioning functions and registers of the OTM memory module.

7. The SoC as recited in claim 2, wherein:
the data interface comprises a memory bus of the SoC;
the SoC further comprises a non-volatile memory storing the boot image; and
the key provisioner loads the boot image from the non-volatile memory into the volatile memory for execution by the hardware-based processor.

8. A computer-readable memory circuit storing processor-executable instructions that, responsive to execution by a hardware-based processor, implement a key provisioner to:
sample, via an analog-to-digital converter, an analog noise source to generate a stream of entropy bits;
feed the stream of entropy bits into a deterministic random bit generator to construct entropy symbols;
access a register to obtain a unique chip identifier associated with a unique identifier of the hardware-based processor, the unique chip identifier associated with a system-on-chip (SoC) in which the hardware-based processor is embodied;
modulate bits of the unique chip identifier with respective ones of the entropy symbols to generate a block of modulated symbols based on the unique chip identifier;
calculate, via a hashing algorithm, a hash digest of the block of modulated symbols generated based on the unique chip identifier to generate a device-level root key; and
write, to a write-only register of a one-time programmable (OTP) memory module, the device-level root key for subsequent writing into an OTP memory of the OTP memory module.

9. The computer-readable memory circuit as recited in claim 8, wherein the key provisioner is further implemented to write, from the write-only register, the device-level root key into a fuse bank of the OTP memory of the OTP memory module.

10. The computer-readable memory circuit as recited in claim 9, wherein the fuse bank into which the device-level root key is written is a write-only fuse bank of the OTP memory.

11. The computer-readable memory circuit as recited in claim 8, wherein the key provisioner is further implemented to calculate an error checking and correcting (ECC) parity value for the device-level root key and write the ECC parity value to the write-only register of the OTP memory.

12. The computer-readable memory circuit as recited in claim 8, wherein the computer-readable memory circuit is a read-only memory (ROM) circuit of the SoC and the processor-executable instructions comprise boot code of the SoC.

13. A method comprising:
sampling, via an analog-to-digital converter, an analog noise source to generate a stream of entropy bits;
feeding the stream of entropy bits into a deterministic random bit generator to construct entropy symbols;
accessing a register to obtain a unique chip identifier associated with a unique identifier of a hardware-based processor, the unique chip identifier associated with a System-on-Chip (SoC) in which the hardware-based processor is embodied;
modulating bits of the unique chip identifier with respective ones of the entropy symbols to generate a block of modulated symbols based on the unique chip identifier;
calculating, via a hashing algorithm, a hash digest of the block of modulated symbols generated based on the unique chip identifier to generate a device-level root key; and writing, to a write-only register of a one-time programmable (OTP) memory module of the SoC, the device-level root key for subsequent writing into an OTP memory of the OTP memory module.

14. The method as recited in claim 13, further comprising:
downloading, to a non-volatile memory of the SOC, a boot image configured to provision the device-level root key into the OTP memory;
verifying authenticity of the boot image by determining that a hash value of the boot image matches a known hash value or determining that a digital signature of the boot image is valid; and
executing, with the hardware-based processor, the boot image to cause the OTP memory module to write, from the write-only register, the device-level root key into the OTP memory.

15. The method as recited in claim 14, further comprising altering a life cycle-state of the OTP memory module to prevent subsequent access to at least a portion of the OTP memory to which the device-level root key is written.

16. The method as recited in claim 14, wherein:
writing the device-level root key into the OTP memory comprises burning, based on respective bit values of the device-level root key, fuses of the OTP memory; and
the boot image, responsive to execution, regulates a voltage level applied to the fuses of the OTP memory during a fuse burning sequence.

17. The method as recited in claim 14, further comprising:
accessing, from another write-only register of the OTP memory module, an error checking and correcting (ECC) value that corresponds to the device-level root key; and
verifying, based on the ECC value, the device-level root key prior to allowing the boot image to cause the OTP memory module to write the device-level key into the OTP memory.

18. The method as recited in claim 13, wherein sampling the analog noise source comprises:
up-sampling, via the analog-to-digital converter, the analog noise source to provide analog noise sample bits;
filtering, via a linear-feedback shift register, the analog noise sample bits to provide digital noise sample bits; and
down-sampling, via a latch, the digital noise sample bits to provide the stream of entropy bits.

19. The method as recited in claim 18, wherein:
respective sampling rates of the analog-to-digital converter and latch are adjustable, and the method further comprises:
altering a rate at which the analog noise source is up-sampled; or
altering a rate at which the digital noise sample bits are down-sampled.

20. The method as recited in claim 13, wherein
the unique chip identifier is a universally unique identifier (UUID) of the SoC or an apparatus in which the SoC is embodied.

* * * * *